United States Patent Office 3,505,895
Patented Apr. 14, 1970

3,505,895
RACK-AND-PINION STEERING SYSTEMS
Raymond A. Ravenel, Sceaux, France, assignor to Societe Anonyme André Citroen, Paris, France
Filed Feb. 14, 1968, Ser. No. 705,382
Claims priority, application France, Mar. 15, 1967, 98,872
Int. Cl. F16h 1/04
U.S. Cl. 74—422                    2 Claims

ABSTRACT OF THE DISCLOSURE

Rack-and-pinion steering gear wherein the rack is slidably guided in a bearing and held in meshing engagement with the driving pinion by a push member, characterized in that said push member is off-set in relation to the driving pinion on the side opposite to that of said bearing.

BACKGROUND OF THE INVENTION

This invention relates to rack-and-pinion steering gears and has specific reference to an improved mechanism of this character.

It is known that in rack-and-pinion steering gears, for example for automotive vehicles, the bar carrying the rack may be guided in various manners; thus, devices are known wherein said bar is guided by a pair of bearings disposed on either side of the driving pinion, with one or more push members acting upon the rack for taking up plays, and other devices have also been proposed wherein the bar is mounted in a single bearing and resiliently and slidably urged by a single push member registering with the driving pinion.

The use of a single push member is not capable, in either case, of taking up simultaneously the meshing or tooth play and the play developing in the bearings; on the other hand, in the second case mentioned hereinabove when the bar is subjected to a force tending to compress the push-member spring, the rack is moved away from the driving pinion. As a result, clashes and vibrations are produced and lead to premature wear and unpleasant noise.

SUMMARY OF THE INVENTION

It is the essential object of the present invention to avoid these inconveniences by providing means for guiding the rack bar by means of a single bearing and a single push member, this push member being off-set in relation to the driving pinion, on the side opposite to said bearing. Due to this off-set arrangement the push member action is more efficient than when it registers with the pinion.

BRIEF DESCRIPTION OF THE DRAWING

The attached drawing illustrates diagrammatically by way of example a typical form of embodiment of this invention. In the drawing.

DESCRIPTION OF THE PREFERRED EMBODIMENT

Figure 1:
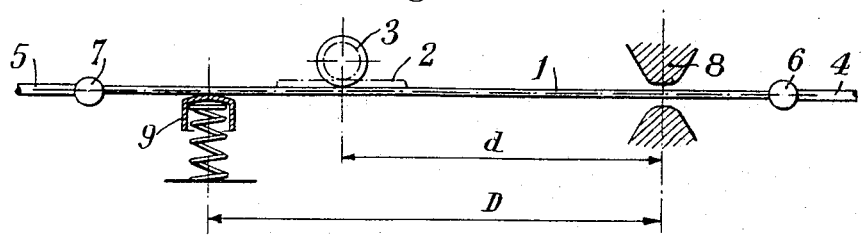
FIGURE 1 is a diagrammatic view of a pinion-and-rack steering gear according to the invention.

The steering bar 1 carrying the toothed rack 2 meshing with the driving pinion 3 and controlling the turning movements of the wheels about their stub-axle axes by means of links 4 and 5 pivotally connected to the ends 6 and 7, respectively, of bar 1, is supported on one side by a bearing 8 and on the other side by a push member 9 disposed on the side opposite to that of bearing 8 in relation to said driving pinion 3.

This push member 9 normally tending to pivot the steering bar 1 about the bearing 8 has a lever arm D and the effort exerted by this push member on the driving pinion 3 has a lever arm $d$; therefore, the effort exerted on the pinion 3, in relation to the force of the spring of push member 9, is multiplied by the proportion existing between the two lever arms D and $d$.

Figure 2:
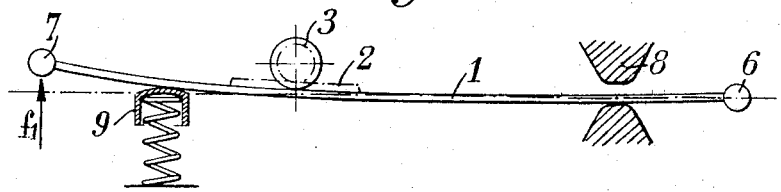
FIGURES 2 to 6 are explanatory figures.

On the other hand, as shown in FIGURE 2, when the steering members on the push member side exert on the bar 1 a force having a transverse component $f_1$ tending to press the rack 2 against its driving pinion 3, i.e. when these members act in the same direction as the push member, the rack bar 1 reacting against the bearing 8 and pinion 3 will be slightly bent, the concavity of this bar being turned towards the pinion 3. Under these conditions, the meshing engagement is obtained without play and with an increased contact pressure.

When the steering members on the push-member side exert on the bar 1 a force having a transverse component $f_2$ (see FIGURES 3 and 4) tending on the other hand to move the rack away from the pinion, the bar 1 reacting against the bearing 8 and the push member 9 is bent in the opposite direction, i.e. with its convexity directed away from the pinion 3.

Figure 3:
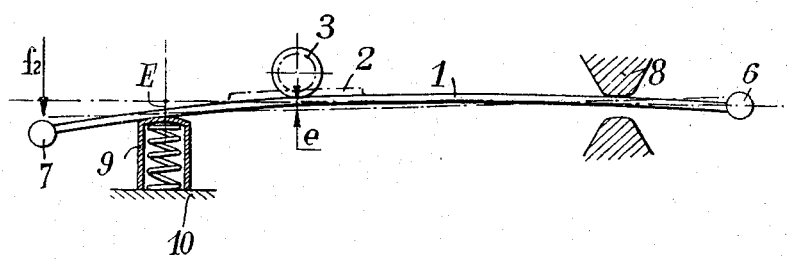

In the case illustrated in FIGURE 3 the push member 9 abuts against a fixed portion 10; its backward movement (in relation to its position corresponding to the absence of any transverse effort $f_2$ or $f_1$) is reduced to a value E (of the order of 0.1 mm. or 0.004") preset when assembling the steering gear.

If the bar 1 were strictly rigid, the meshing play would be $$e = \frac{d}{D} E$$

therefore less than the play E when the push member is co-planar with the pinion. Moreover, this play is reduced by the rack distortion.

Figure 4:
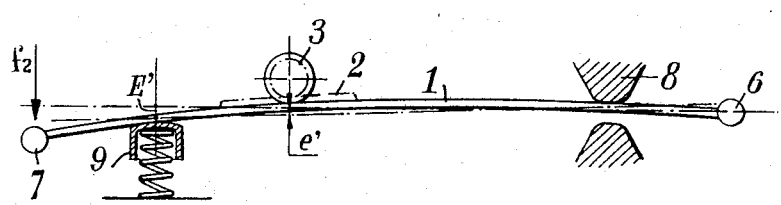

In the case illustrated in FIGURE 4, the push member 9 does not abut against a fixed portion but the stiffness of its spring is calculated as a function of the flexibility of bar 1 so that the depression of this push member under the transverse force $f_2$ causes the bending of bar 1, thus balancing the play $e$ which would appear between the pinion 3 and rack 2 if the bar 1 were strictly rigid.

As a result, the play is taken up continuously, which is favorable to a noiseless operation and to a reduction in teeth wear.

Figure 6:
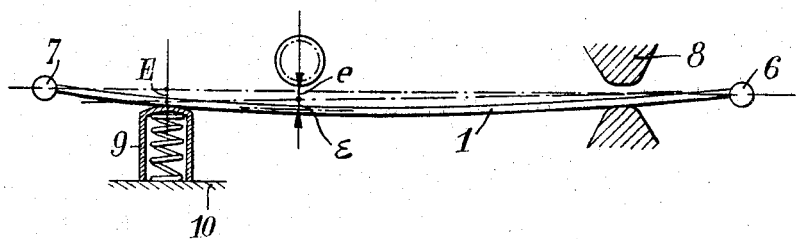

In case of arrangements incorporating push members having a limited yielding stroke, the off-set mounting of the push member is also advantageous (see FIGURE 6) in that the useful backward movement of rack 3, limited theoretically to a value $$e = \frac{d}{D} E$$

may occasionally be increased by the sag of bar 1 which, of course, is not strictly rigid but somewhat liable to distortion. As a result, the meshing engagement of thicker teeth (as a consequence of unavoidable manufacturing irregularities) or the accidental passage of solid particles between the meshing teeth, will cause "hard spots" to appear in the steering and risks of damages which are considerably less important than in steering gears having the push member 9 co-planar or aligned with the pinion 3; therefore, the limited backward movement E of the push member may be adjusted to a lower value.

Figure 5:
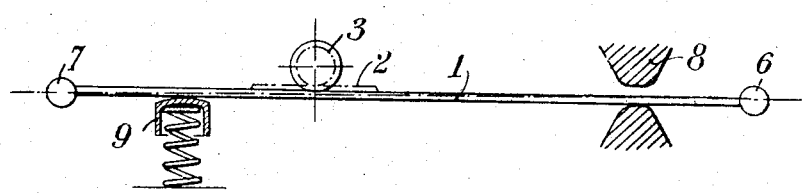

On the other hand, as shown in FIGURE 5, when the efforts applied to the steering bar 1 by the members connecting same to the wheels are moderate, the push member 9, by its action exerted on the bar 1 reacting against the pinion 3, will take up the play between said steering bar and the bearing 8.

What I claim is:

1. A system for steering the wheels of a vehicle, which comprises a steering pinion, a bar provided in its intermediate portion with rack teeth engaged by said pinion, said bar extending on either side of said rack teeth to provide two plain portions having their outer ends adapted to be connected to the wheels to be steered, a bearing in which one of said two plain portions of the bar is slidably mounted, and a resiliently biased push member acting against the other plain portion of said bar and constantly urging same in the direction to maintain the meshing engagement between said rack teeth and said pinion.

2. A system as set forth in claim 1, further comprising means for positively limiting the backward movement of said push member.

References Cited

UNITED STATES PATENTS

| | | | |
|---|---|---|---|
| 2,489,595 | 11/1949 | Spoor | 74—422 X |
| 3,157,061 | 11/1964 | Parker | 74—422 X |

FOREIGN PATENTS

| | | |
|---|---|---|
| 776,052 | 6/1957 | Great Britain. |
| 553,935 | 1/1957 | Italy. |

MILTON KAUFMAN, Primary Examiner

U.S. Cl. X.R.

74—498